(12) United States Patent
Kizaki et al.

(10) Patent No.: US 8,303,144 B2
(45) Date of Patent: Nov. 6, 2012

(54) MOTORCYCLE

(75) Inventors: Tokujiro Kizaki, Saitama (JP); Yojiro Tsutsumi, Saitama (JP); Koshi Hayakawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 632 days.

(21) Appl. No.: 12/200,368

(22) Filed: Aug. 28, 2008

(65) Prior Publication Data
US 2009/0059611 A1 Mar. 5, 2009

(30) Foreign Application Priority Data

Aug. 31, 2007 (JP) ................................ 2007-226547

(51) Int. Cl.
| B62J 6/00 | (2006.01) |
| F21V 33/00 | (2006.01) |
| A61H 3/04 | (2006.01) |
| B62D 55/00 | (2006.01) |
| B62K 11/00 | (2006.01) |

(52) U.S. Cl. ........ 362/473; 362/500; 362/474; 280/200; 180/9.25; 180/219

(58) Field of Classification Search .......... 362/473–476, 362/500; 280/200; 180/9.25, 219
See application file for complete search history.

(56) References Cited

U.S. PATENT DOCUMENTS

| 4,686,656 | A | * | 8/1987 | Morishima | ................. | 362/473 |
| 5,964,312 | A | * | 10/1999 | Maldonado | ................. | 180/227 |
| 6,036,339 | A | | 3/2000 | Idoeta | | |
| 6,592,242 | B1 | * | 7/2003 | Scaccia | ..................... | 362/473 |
| 6,814,477 | B2 | * | 11/2004 | Yamaguchi et al. | .......... | 362/497 |
| 6,863,425 | B2 | * | 3/2005 | Hatfield, Jr. | ................. | 362/473 |
| 7,131,755 | B1 | * | 11/2006 | Feng | ........................ | 362/473 |
| 7,220,028 | B2 | * | 5/2007 | Nakayama et al. | ........... | 362/474 |
| 7,281,831 | B2 | * | 10/2007 | Kouchi et al. | ................. | 362/540 |
| 7,306,358 | B2 | * | 12/2007 | Treat | ........................... | 362/633 |

FOREIGN PATENT DOCUMENTS
GB 537074 A 6/1941
JP 2003-300488 A 10/2003

* cited by examiner

*Primary Examiner* — David J Makiya
(74) *Attorney, Agent, or Firm* — Birch, Stewart, Kolasch & Birch, LLP

(57) ABSTRACT

A motorcycle is easily recognized by other vehicles or pedestrians and is hardly damaged during a maximum bank, by devising the disposition of lighting fixtures. An area surrounded by a vertical line passing on each of both side surfaces of a front wheel, a horizontal line passing through a protrusion of a step serving as a first grounding portion, and a straight line for connecting the first grounding portion with an intersection between the vertical line and the ground, is set. Lighting fixtures are provided in the area, as seen from the front side. The lighting fixtures are mounted to lower ends of front forks that support a shaft of the front wheel. The lighting fixture are mounted to lower rear ends of swing arms that support a shaft of the rear wheel. A lamp of each of the lighting fixtures is composed of an assembly of a plurality of light-emitting diodes.

20 Claims, 3 Drawing Sheets

MOTORCYCLE

CROSS-REFERENCE TO RELATED APPLICATIONS

This nonprovisional application claims priority under 35 U.S.C. §119(a) on patent application No. 2007-226547, filed in Japan on Aug. 31, 2007, the entirety of which is incorporated herein by reference.

BACKGROUND OF THE INVENTION

1. Field of the Invention

The present invention relates to a motorcycle. In particular, the present invention relates to a motorcycle including lighting devices that are disposed to improve the visibility with respect to a third person.

2. Background of the Invention

Since the size of a motorcycle is smaller than a four-wheeled vehicle, such as a passenger car or a truck, the visibility of the motorcycle to a third person may deteriorate. There has been proposed a motorcycle where at least one lamp of a lamp system of a two-wheel vehicle is disposed below an axle on the front side of the rearmost portion of a front wheel or on the rear side of the front most portion of a rear wheel. This motorcycle has been disclosed in JP-A No. 2003-300488.

The motorcycle in the background art disclosed in JP-A No. 2003-300488 has a structure where a lamp is disposed on the lower side, which has not been seen in the past. Accordingly, it is effective in being easily noticeable. However, if a bank angle is increased during cornering, a first grounding point, i.e. a portion of the lamp mounted to a lower portion of a vehicle body, which initially comes in contact with the ground during banking, becomes a cover of the lamp. Therefore, when cornering is performed with a large bank angle, there is a concern that the lamp is affected.

SUMMARY OF THE INVENTION

An object of the present invention is to provide a motorcycle that can ensure a bank angle during the travel of a vehicle and improve the visibility with respect to a third person.

In order to achieve the object, according to a first aspect of the present invention, a motorcycle includes a lighting fixture. The lighting fixture is provided, as seen from the front side, in an area that is surrounded by a vertical line passing on each of both side surfaces of a front wheel, a horizontal line passing through a first grounding portion that initially comes in contact with the ground when a vehicle body is banked, a straight line for connecting the first grounding portion with an intersection between the vertical line and the ground.

Furthermore, according to a second aspect of the present invention, the first grounding portion may be a protrusion provided at the lower portion of a tip of a step on which an occupant's foot is placed.

Furthermore, according to a third aspect of the present invention, the lighting fixture may be mounted to at least one of a lower end of a front fork for supporting a front wheel shaft and a lower rear end of a swing arm for supporting a rear wheel shaft.

In addition, according to a fourth aspect of the present invention, a lamp of the lighting fixture may be formed of a light-emitting diode.

Furthermore, according to a fifth aspect of the present invention, a lamp of the lighting fixture may be a reflective plate.

Furthermore, according to a sixth aspect of the present invention, the first grounding portion may be a grounding end of a center stand.

According to the first aspect of the present invention, the lighting fixture is provided inside a straight line, which connects the first grounding portion with a grounding portion of the front wheel during banking, in a width direction of the vehicle body. When the motorcycle is banked to the maximum extent, the first grounding portion is grounded. Accordingly, it is possible to prevent the lighting fixture, which is provided inside the first grounding portion in the width of the vehicle body, from being grounded first of all during banking of the motorcycle. Furthermore, it is possible to improve the visibility of the motorcycle by the lighting of the lighting fixture that is provided at a peculiar position, i.e. at the lower portion of the vehicle body.

According to the second aspect of the present invention, when the lower portion of the tip of the step is grounded during the maximum bank, an occupant recognizes that the lower portion of the tip of the step is grounded and can then reduce a bank angle. Therefore, it is easy to protect the lighting fixture.

According to the third aspect of the present invention, it is possible to dispose the lighting fixture so as to be further close to the end of the vehicle body in the front and rear directions on the lower side of the vehicle body, for example. Therefore, other vehicles on the front and rear sides easily and accurately recognize a distance between themselves and the motorcycle.

According to the fourth aspect of the present invention, a light-emitting diode having high illumination for its size is used. Therefore, a third person can easily recognize the motorcycle and electric power consumption is also decreased.

According to the fifth aspect of the invention, since it is possible to make the motorcycle be easily recognized from the outside by reflecting external light without using electric power, the structure is simplified.

According to the sixth aspect of the present invention, in a scooter type motorcycle where the grounding end of the center stand protrudes outward from the vehicle body while being flipped up, it is possible to improve the visibility with respect to a third person.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
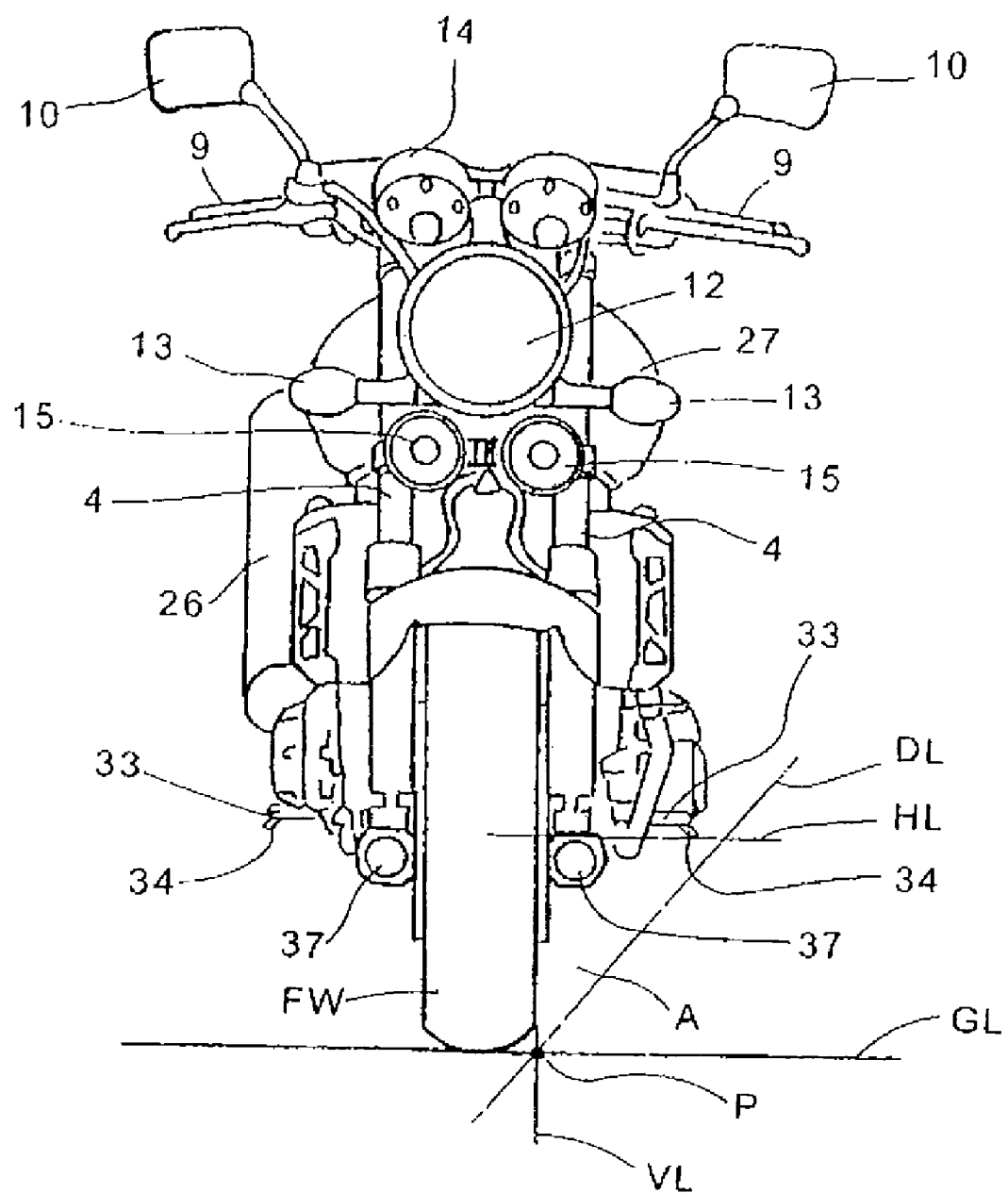
FIG. 1 is a front view of a motorcycle according to an embodiment of the present invention.

The present invention will now be described in detail with reference to the accompanying drawings, wherein the same reference numerals will be used to identify the same or similar elements throughout the several views. It should be noted that the drawings should be viewed in the direction of orientation of the reference numerals.

Figure 2:
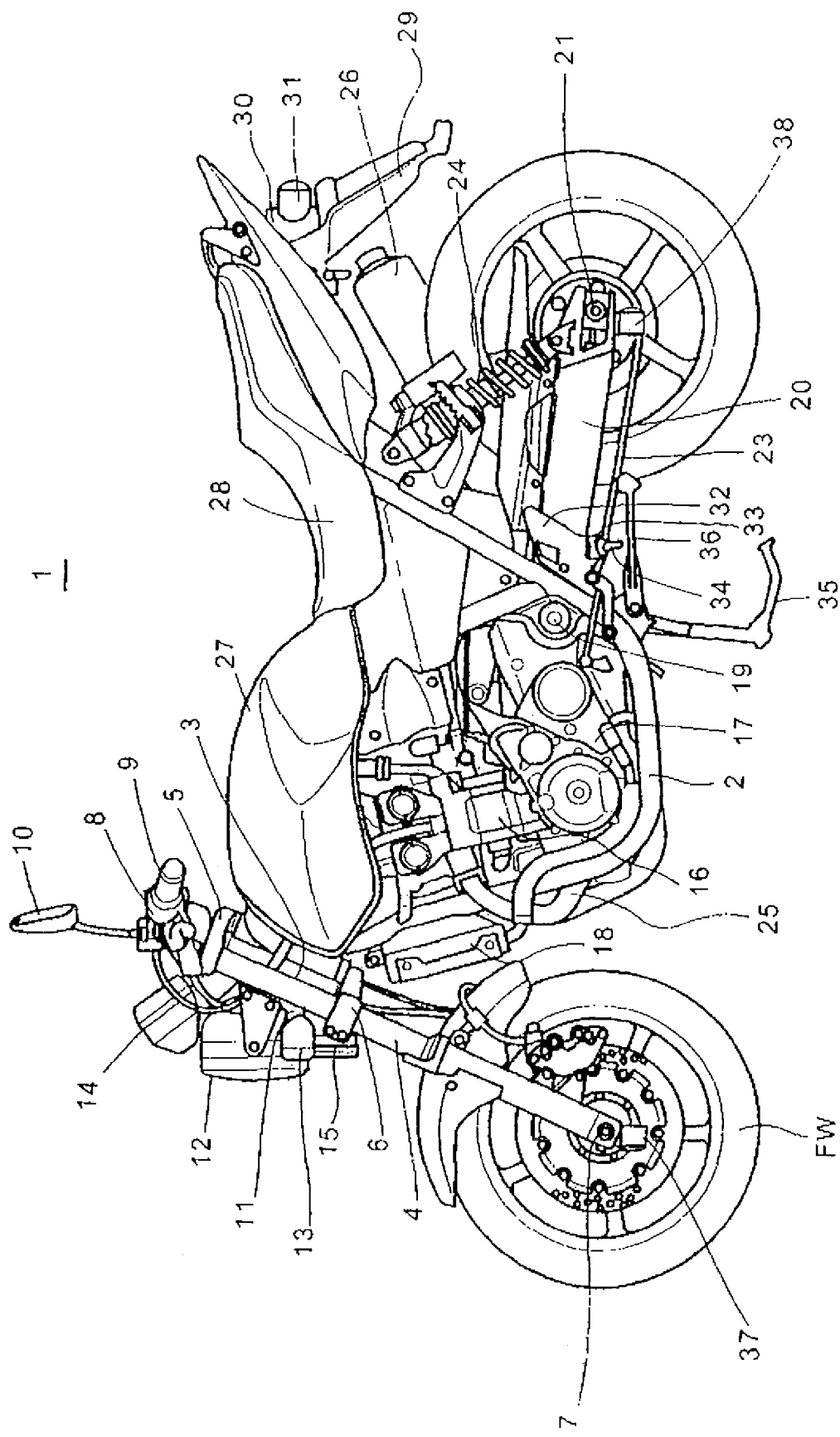
FIG. 2 is a side view of the motorcycle according to the embodiment of the present invention.

An embodiment of the present invention will be described below with reference to drawings. FIG. 1 is a front view of a motorcycle according to an embodiment of the present invention, and FIG. 2 is a left side view. A motorcycle 1 includes a frame body 2 that is composed of a pair of (left and right) pipe frames. A steering stem (not shown) is rotatably supported by a head pipe 3 that is fixed to the front portion of the frame body 2. Upper and lower portions of the steering stem are connected to top and bottom bridges 5 and 6 of front forks 4, respectively. The front forks 4 extend downward, and support a front wheel FW by a front wheel shaft 7 provided near the lower ends thereof.

A handlebar pipe 8 is connected to the top bridge 5. A grip 9 and a mirror 10 are mounted on the handlebar pipe 8. A bracket 11 is fixed to the front forks 4. A headlight 12, front turn signal lamps 13, and a meter 14 are mounted on the bracket 11. Horns 15 are mounted on the bottom bridge 6.

An engine 16 is mounted on the frame body 2. A transmission 17 is provided below the engine. A radiator 18 is provided on the front side of the engine. Swing arms 20 are swingably supported by a shaft 19 that is provided substantially at the central portion of the frame body 2. A rear wheel RW is rotatably supported at the end of the swing arm 20 by a rear wheel shaft 21. A driving chain 23 is suspended between an output shaft (not shown) of the transmission 17 and the rear wheel shaft 21. An upper end of a rear suspension 24 is connected to the rear portion of the frame body 2. A lower end of the rear suspension 24 is connected to the rear end of each swing arm 20. An exhaust pipe 25 provided on the front side of the engine 16 extends toward the rear side of a vehicle body. A muffler 26 is mounted to an extended end of the exhaust pipe 25.

A fuel tank 27 is provided at the upper portion of the frame body 2. An occupant's seat 28 is provided on the rear side of the fuel tank 27. A mudguard 29, tail/brake lights 30, and rear turn signal lamps 31 are provided on the rearmost portion of the frame body 2.

Brackets 32 are fixed on the rear side of the shaft 19 of the swing arm 20. Steps (occupant's footrests) 33 are mounted to the brackets 32 that protrude outward in a width direction of the vehicle body, respectively. A protrusion 34 serving as a bank sensor is provided on the lower portion of a tip of each step 33. The step 33 is elastically mounted to the bracket 32 by a spring. Therefore, when the protrusion 34 is grounded, the step 33 is pushed up and absorbs a grounding impact. Then, when a bank angle is reduced, the step returns to an original position due to the action of the spring. Since the impact absorbing structure of the step is widely known, the detailed description thereof will be omitted. A main stand 35 and a side stand 36 are mounted on the lower portion of the frame body 2.

The motorcycle 1 according to this embodiment includes the headlight 12, the front turn signal lamps 13, the rear turn signal lamps 31, and the tail/brake lights 30. However, the motorcycle further includes a lighting fixture in order to improve the visibility with respect to a third person.

In order to improve the visibility, lighting fixtures 37, which are oriented in a traveling direction of the vehicle body, are provided at the lower ends of the left and right front forks 4, respectively. In addition, lighting fixtures 38 are provided at the lower rear portions of the swing arms 20 in order to improve the visibility on the rear side. Both of the lighting fixtures 37 and 38 may be preferably provided, but only one of the lighting fixtures 37 and 38 may be provided. A lamp, i.e. a lighting body of each of the lighting fixtures 37 and 38 may be a light bulb. However, it is preferable that the lamp be the assembly of one or more light-emitting diodes (in which a plurality of light-emitting diodes is disposed in an arbitrary shape, such as a circular shape or a rectangular shape). The reason for this is that electric power saving and high illumination of the lamp can be achieved. The lighting fixtures 37 and 38 may be configured so as to be lighted while the engine 16 of the motorcycle 1 is driven.

Since the lighting fixtures are also provided at the lower portion of the vehicle body as described above, it is possible to improve the visibility with respect to a third person.

The positions of the lighting fixtures 37 and 38 are not limited to the front forks 4 or the swing arms 20. The lighting fixtures may be provided at any portions of the vehicle body in the front and rear directions, but are provided at the lower portion of the vehicle body that is limited as follows in the front view of the motorcycle 1, i.e. FIG. 1.

In FIG. 1, each of the lighting fixtures 37 and 38 is provided in an area A surrounded by a horizontal line HL passing through the tip of the protrusion 34 of the step 33; a vertical line VL passing on each of both side surfaces of the front wheel FW; and a straight line DL for connecting the tip of the protrusion 34 with an intersection P between the vertical line VL and a ground plane GL when the front wheel FW is erected. In this case, the front wheel FW particularly indicates a rubber tire.

In this case, the protrusion 34 has been selected as an element that defines the horizontal line HL and the straight line DL for forming the area A, but the invention is not limited thereto. The protrusion 34 is a portion, which initially comes in contact with the ground when the motorcycle 1 is banked, i.e. a first grounding portion. Therefore, in the structure where a cowl, an engine case, a muffler or the like is grounded before the step during banking due to the types or kinds of motorcycles, the above-mentioned part instead of the protrusion 34 is used as the first grounding portion, and is selected as an element that defines the horizontal line HL and the straight line DL for forming the area A.

In the above-mentioned embodiment, a step or a cowl has been supposed as the first grounding portion during the bank. However, if the present invention is applied to a scooter type motorcycle, a grounding end (a portion grounded while being used) of a center stand, which is flipped up as compared to a cowl including a step while not being used, i.e. while the vehicle travels, may be used as the first grounding portion. Therefore, in the scooter type motorcycle, the area A may be determined by using the grounding end of the center stand as the first grounding portion.

The above-mentioned embodiment has exemplified a case where the lighting fixtures 37 and 38 have been provided both at the lower ends of the front forks 4 and at the lower rear ends of the swing arms 20 for supporting the rear wheel shaft. However, the present invention is not limited to this embodiment, and the lighting fixtures may be provided at any one of the lower ends of the front forks 4 and the lower rear ends of the swing arms 20.

Figure 3:
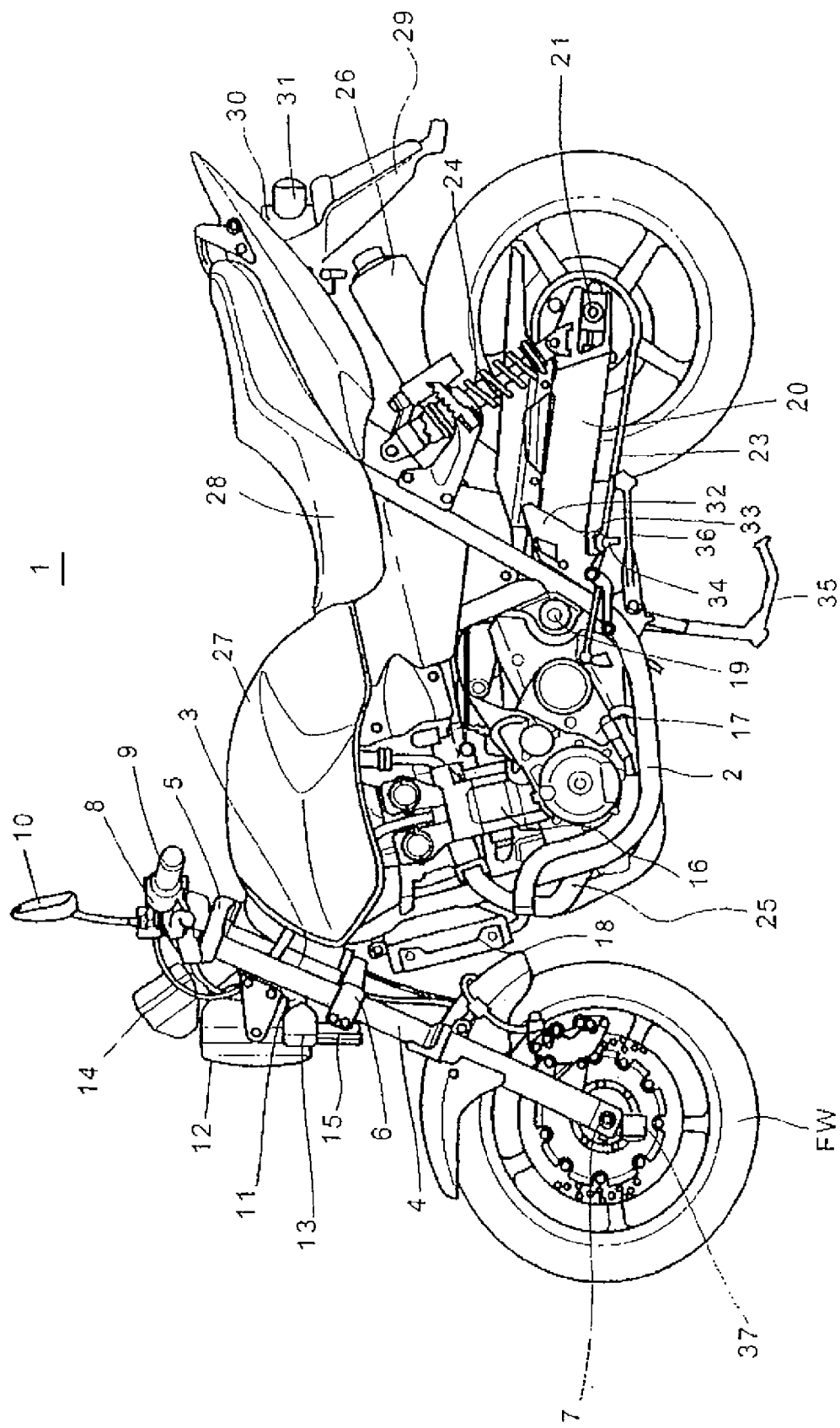
FIG. 3 is a side view of a motorcycle according to a second embodiment of the present invention.

FIG. 3 is a side view of a motorcycle according to a second embodiment of the present invention. The same reference numerals as those in FIGS. 1 and 2 indicate the same or equivalent portions. In FIG. 3, a lighting fixture 37 is mounted to a lower end of a front fork 4 (although not shown, a lighting fixture is also mounted on the right side of a vehicle body). The lighting fixtures 38, which have been described with reference to FIGS. 1 and 2 and provided at the lower rear ends of the swing arms 20, are not provided in the second embodiment. According to the second embodiment, the visibility of the motorcycle 1 is improved on the front side.

Further, the lamp is not limited to a light bulb or a light-emitting diode, and a reflective plate may be used as the lamp. The reflective plate may be formed by arranging a plurality of corner cubes.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle comprising:
   at least one lighting fixture provided, as seen from a front side, in an area surrounded by a vertical line passing on each of both side surfaces of a front wheel, a horizontal line passing through a first grounding portion that initially comes in contact with the ground when a vehicle body is banked, and a straight line for connecting the first grounding portion with an intersection between the vertical line and the ground,
   wherein the at least one lighting fixture is located either directly below a bottom of a front fork directly extending from a front wheel shaft or directly below a rear bottom of a swing arm supporting a rear wheel shaft.

2. The motorcycle according to claim 1, wherein the first grounding portion is a protrusion provided on a lower portion of a tip of a step on which an occupant's foot is placed.

3. A motorcycle comprising:
   at least one lighting fixture provided, as seen from a front side, in an area surrounded by a vertical line passing on each of both side surfaces of a front wheel, a horizontal line passing through a first grounding portion that initially comes in contact with the ground when a vehicle body is banked, and a straight line for connecting the first grounding portion with an intersection between the vertical line and the ground,
   wherein the at least one lighting fixture includes a plurality of lighting fixtures, one of the lighting fixtures is located directly below a bottom of the front fork supporting a front wheel shaft, and another one of the lighting fixtures is directly below a rear bottom of a swing arm supporting a rear wheel shaft.

4. The motorcycle according to claim 1, wherein a lamp of the at least one lighting fixture is formed of a light-emitting diode.

5. The motorcycle according to claim 2, wherein a lamp of the at least one lighting fixture is formed of a light-emitting diode.

6. The motorcycle according to claim 3, wherein a lamp of the at least one lighting fixture is formed of a light-emitting diode.

7. The motorcycle according to claim 1, wherein a lamp of the at least one lighting fixture includes a reflective plate.

8. The motorcycle according to claim 2, wherein a lamp of the at least one lighting fixture includes a reflective plate.

9. The motorcycle according to claim 3, wherein a lamp of the at least one lighting fixture includes a reflective plate.

10. The motorcycle according to claim 1, wherein the first grounding portion is a grounding end of a center stand.

11. A two-wheel vehicle, comprising:
    a body frame;
    a front wheel mounted to the body frame by front forks;
    a rear wheel mounted to the body frame by a swing arm;
    a grounding portion mounted to said body frame, said grounding portion being a portion that first contacts the ground during banking of the motorcycle; and
    at least one lighting fixture,
    wherein said at least one lighting fixture is located within an area surrounded by a vertical line passing a side surface of the front wheel, a horizontal line passing through the grounding portion, and a straight line connecting the grounding portion with an intersection between the vertical line and the ground, and
    wherein the at least one lighting fixture is located either directly below a bottom of a front fork directly extending from a front wheel shaft or directly below a rear bottom of a swing arm supporting a rear wheel shaft.

12. The two-wheel vehicle according to claim 11, wherein the grounding portion is a protrusion provided on a lower portion of a tip of a step on which an occupant's foot is placed.

13. A two-wheel vehicle, comprising:
    a body frame;
    a front wheel mounted to the body frame by front forks;
    a rear wheel mounted to the body frame by a swing arm;
    a grounding portion mounted to said body frame, said grounding portion being a portion that first contacts the ground during banking of the motorcycle; and
    at least one lighting fixture,
    wherein said at least one lighting fixture is located within an area surrounded by a vertical line passing a side surface of the front wheel, a horizontal line passing through the grounding portion, and a straight line connecting the grounding portion with an intersection between the vertical line and the ground,
    wherein the at least one lighting fixture includes a plurality of lighting fixtures, one of the lighting fixtures is located directly below a bottom of a front fork supporting a front wheel shaft, and another one of the lighting fixtures is directly below a rear bottom of a swing arm supporting a rear wheel shaft.

14. The two-wheel vehicle according to claim 11, wherein a lamp of the at least one lighting fixture is formed of a light-emitting diode.

15. The two-wheel vehicle according to claim 12, wherein a lamp of the at least one lighting fixture is formed of a light-emitting diode.

16. The two-wheel vehicle according to claim 13, wherein a lamp of the at least one lighting fixture is formed of a light-emitting diode.

17. The two-wheel vehicle according to claim 11, wherein a lamp of the at least one lighting fixture includes a reflective plate.

18. The two-wheel vehicle according to claim 12, wherein a lamp of the at least one lighting fixture includes a reflective plate.

19. The two-wheel vehicle according to claim 13, wherein a lamp of the at least one lighting fixture includes a reflective plate.

20. The two-wheel vehicle according to claim 11, wherein the grounding portion is a grounding end of a center stand.

* * * * *